Patented May 6, 1930

1,757,222

UNITED STATES PATENT OFFICE

WILHELM SCHEPSS, OF LEVERKUSEN-ON-THE-RHINE, ERNST TIETZE, OF COLOGNE-ON-THE-RHINE, AND ANTON OSSENBECK, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MOTHPROOF MATERIAL AND PROCESS OF MAKING SAME

No Drawing. Application filed December 20, 1928, Serial No. 327,466, and in Germany December 28, 1927.

The present invention relates to a process of rendering materials liable to be attacked by moths immune against attack by moths, to the moth proof articles obtainable thereby and to new compositions of matter.

In accordance with the present invention borontrifluoride is applied to the animal fibre, rendering the same thereby permanently immune against attack by moths. The borontrifluoride, being a gaseous substance, can be used alone, for instance, by introducing the material to be rendered mothproof into an atmosphere of borontrifluoride, care being taken that no water is present, because the borontrifluoride is decomposed by water. In general we employ the borontrifluoride in conjunction with an organic medium. For instance, we prepare a solution of borontrifluoride in hydrocarbons, such as benzene, benzine or in chlorinated hydrocarbons or alcohols, ethers and the like. The solutions are prepared by passing the borontrifluoride into the solvent, until it is saturated with the gas; in using the solutions they are diluted with a solvent, such as hydrocarbons to form an about 1% solution. In passing the borontrifluoride into liquid compounds, containing carbonyl groups, such as ketones, aldehydes, esters and the like, addition compounds are formed of a definite composition (compare Comptes rendues, volume 86, pages 539, 601, 672, 1463). These compounds generally are obtainable by reacting with borontrifluoride upon the liquid carbonyl compounds in molecular quantities. For example, the compound of aceto-phenone with borontrifluoride is prepared by passing at room temperature borontrifluoride, evolved by heating 115 parts by weight of potassium borofluoride, 20 parts by weight of boric acid anhydride and concentrated sulfuric acid, into 120 parts by weight of acetophenone, the gas being completely absorbed. The resulting complex compound is distilled in vacuo; it boils at 97–100° under 25 mm. pressure and partially solidifies in the receiver.

Similar complex compounds are formed on leading borontrifluoride into benzaldehyde, acetone, acetoacetic ester, acetic ester, phthalic acid ester and many others.

The products of addition are soluble in organic solvents, such as benzine or chlorinated hydrocarbons, with the result that in the chemical cleaning of clothes and the like they can be added to the cleaning bath; for the purpose of our invention, we generally use a solution containing about 1% of the compound of addition. The materials to be rendered moth proof are treated with the solution, squeezed and dried. When the treated materials are subsequently rinsed with water the fastness against attack by moths is not lost. Since borontrifluoride is decomposed by water, this behaviour is surprising and can only be explained by the supposition, that presumably borontrifluoride forms with the aminoacids of the wool insoluble complex compounds, which are not decomposed by water.

For the purpose of our invention the borontrifluoride and its addition compounds herein described are equivalents.

Our invention is illustrated by the following typical example, but is not limited thereto:

*Example.*—100 kg. of wool are steeped in a 1% solution of the addition product of borontrifluoride with acetophenone in benzine, centrifuged and dried; the wool thus treated is then protected against the attack of textile pests to a remarkable degree.

In the claims we understand under the term "borontrifluoride compound" the free borontrifluoride and its addition products with carbonyl compounds.

We claim:

1. The process for rendering mothproof materials, liable to be attacked by moths, which process comprises treating the material to be rendered mothproof with a borontrifluoride compound.

2. The process for rendering mothproof materials, liable to be attacked by moths, which process comprises treating the material to be rendered mothproof with a compound of addition of borontrifluoride and a carbonyl compound.

3. The process for rendering mothproof materials, liable to be attacked by moths, which process comprises treating the material to be rendered mothproof with a compound of addition of borontrifluoride and a ketone.

4. The process for rendering mothproof materials, liable to be attacked by moths, which process comprises treating the material to be rendered mothproof with a compound of addition of borontrifluoride and a carbonyl compound with the addition of a solvent.

5. The process for rendering mothproof materials, liable to be attacked by moths, which process comprises treating the material to be rendered mothproof with a compound of addition of borontrifluoride and a ketone with the addition of a solvent.

6. The process which comprises treating wool with a 1% benzine solution of the addition compound of borontrifluoride and acetophenone, squeezing the material and drying the same.

7. Materials liable to be attacked by moths having incorporated therewith borontrifluoride.

8. As a new moth proofing medium a borontrifluoride compound.

9. As a new moth proofing medium, a composition of matter containing an addition compound of borontrifluoride and a carbonyl compound.

10. As a new moth proofing medium, a composition of matter comprising an addition compound of borontrifluoride and a carbonyl compound, and a solvent.

11. As a new moth proofing medium, a composition of matter comprising the addition compound of borontrifluoride and acetophenone, and benzine.

In testimony whereof we have hereunto set our hands.

WILHELM SCHEPSS. [L. S.]
ERNST TIETZE. [L. S.]
ANTON OSSENBECK. [L. S.]